(12) United States Patent
Porter et al.

(10) Patent No.: US 10,731,562 B2
(45) Date of Patent: Aug. 4, 2020

(54) COMBUSTOR PANEL STANDOFFS WITH COOLING HOLES

(71) Applicant: UNITED TECHNOLOGIES CORPORATION, Farmington, CT (US)

(72) Inventors: Steven D. Porter, Wethersfield, CT (US); Jonathan Lemoine, Vernon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 284 days.

(21) Appl. No.: 15/651,297

(22) Filed: Jul. 17, 2017

(65) Prior Publication Data
US 2019/0017440 A1 Jan. 17, 2019

(51) Int. Cl.
F02C 7/18 (2006.01)
F02C 3/04 (2006.01)
F23R 3/00 (2006.01)
F23R 3/06 (2006.01)

(52) U.S. Cl.
CPC .................. F02C 7/18 (2013.01); F02C 3/04 (2013.01); F23R 3/002 (2013.01); F23R 3/005 (2013.01); F23R 3/06 (2013.01); F05D 2220/32 (2013.01); F05D 2230/31 (2013.01); F05D 2240/35 (2013.01); F05D 2260/20 (2013.01); F23R 2900/00018 (2013.01); F23R 2900/03041 (2013.01); F23R 2900/03045 (2013.01)

(58) Field of Classification Search
CPC .... F23R 3/002; F23R 3/04; F23R 3/06; F23R 3/26; F23R 3/045; F23R 3/48; F23R 3/50; F23R 2900/030401; F23R 2900/03042; F23R 2900/030402; F02C 7/18; F05D 2240/325
See application file for complete search history.

(56) References Cited

U.S. PATENT DOCUMENTS

| 6,435,816 | B1* | 8/2002 | Czachor ................. F01D 5/081 415/116 |
| 8,099,961 | B2 | 1/2012 | Gerendas |
| 9,518,738 | B2 | 12/2016 | Gerendas |
| 9,976,441 | B2* | 5/2018 | Lacy ....................... F01D 5/189 |
| 2002/0124572 | A1 | 9/2002 | Pidcock et al. |

(Continued)

FOREIGN PATENT DOCUMENTS

WO          9525932       *  9/1995

OTHER PUBLICATIONS

European Patent Office, European Search Report dated Oct. 18, 2018 in Application No. 18179600.4.

Primary Examiner — Todd E Manahan
Assistant Examiner — David P. Olynick
(74) Attorney, Agent, or Firm — Snell & Wilmer L.L.P.

(57) ABSTRACT

A combustor panel may comprise a panel wall comprising a proximal surface and a distal surface. A standoff may be formed over the distal surface of the panel wall. An aperture may be formed through the standoff and may extend from a face of the standoff to the proximal surface of the panel wall. The face of the first standoff may be oriented at an angle between 90 degrees and 160 degrees relative to a plane parallel to the distal surface of the panel wall.

19 Claims, 6 Drawing Sheets

(56) References Cited

U.S. PATENT DOCUMENTS

| | | | |
|---|---|---|---|
| 2004/0003599 A1* | 1/2004 | Ingram | F23R 3/045 60/804 |
| 2010/0071382 A1* | 3/2010 | Liang | F01D 9/023 60/806 |
| 2014/0238030 A1* | 8/2014 | Gerendas | F23R 3/002 60/754 |
| 2014/0338347 A1* | 11/2014 | Gage | F23R 3/06 60/754 |
| 2015/0128602 A1* | 5/2015 | Clemen | F23R 3/002 60/754 |
| 2015/0226085 A1* | 8/2015 | Spangler | F01D 25/12 60/806 |
| 2015/0315930 A1 | 11/2015 | Koonankeil et al. | |
| 2016/0123592 A1 | 5/2016 | Drake et al. | |
| 2017/0009993 A1* | 1/2017 | Monahan | F23R 3/286 |
| 2017/0059162 A1* | 3/2017 | Papple | F23R 3/16 |
| 2017/0176006 A1* | 6/2017 | Gerendas | F23R 3/002 |

* cited by examiner

COMBUSTOR PANEL STANDOFFS WITH COOLING HOLES

FIELD

The present disclosure relates to cooling structures for gas turbine engines and, more specifically, to cooling structures for combustor panels.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

In the combustion section, a casing or "combustor panel" may surround the combustion chamber. The combustor panel may include various cooling features. For example, raised features, such as bumps or pins, may be formed on the radially outward surface of the combustor panel (i.e., on the surface opposite the combustion gas flowpath) to increase a surface area of the radially outward surface and facilitate dissipation of heat from the combustor panel. Cooling holes may also be formed through the combustor panel. Current methods of forming combustor panel cooling holes tend to include laser drilling through the radially inward surface of the combustor panel. However, the desired density of the raised features and diameter of cooling holes tends to cause the laser to strike the raised features. The laser striking the raised features may break off portions of the raised features. These broken off portions may clog the cooling holes and/or travel into the gas flowpath and damage downstream engine components. Further, breaking off the raised features decreases the surface area of the raised feature/combustor panel, which may reduce heat dissipation and increase cooling variability.

SUMMARY

A combustor panel is provided according to various embodiments. A combustor panel may comprise a panel wall comprising a proximal surface and a distal surface opposite the proximal surface. A first standoff may be formed over the distal surface of the panel wall. A first aperture may be formed through the first standoff and may extend from a first face of the first standoff to the proximal surface of the panel wall. The first face of the first standoff may be oriented at an angle between 90 degrees and 160 degrees relative to a plane parallel to the distal surface of the panel wall.

In various embodiments, a central axis of the first aperture may be oriented at an angle between 10 degrees and 70 degrees relative to the plane parallel to the distal surface of the panel wall. A wall of the first standoff and the distal surface of the panel wall may form an angle between 10 degrees and 80 degrees. A second standoff may be formed over the distal surface of the panel wall. A second face of the second standoff may extend to the distal surface of the panel wall. The wall of the first standoff may comprise a substantially uniform thickness.

In various embodiments, a plurality of apertures including the first aperture may be formed through the first standoff. In various embodiments, the first face of the first standoff may comprise at least one of a circular shape or a semi-circular shape. A first diameter of the first aperture proximate the first face of the first standoff may less than a second diameter of the first aperture proximate the proximal surface of the panel wall.

A gas turbine engine is provided according to various embodiments. A gas turbine engine may comprise a compressor and a combustor in fluid communication with the compressor and including a combustor panel. The combustor panel may comprise a panel wall comprising a proximal surface and a distal surface opposite the proximal surface. A first standoff may be formed over the distal surface of the panel wall. A first aperture may be formed through the first standoff and may extend from a face of the first standoff to the proximal surface of the panel wall. The face of the first standoff may be oriented at an angle between 90 degrees and 160 degrees relative to a plane parallel to the distal surface of the panel wall.

In various embodiments, the first aperture may be oriented at an angle between 10 degrees and 70 degrees relative to the plane parallel to the distal surface of the panel wall. A distal edge of a first face of the first standoff may be raised with respect to the distal surface of the panel wall.

In various embodiments, a wall of the first standoff and the distal surface of the panel wall may form an angle between 10 degrees and 80 degrees. A plurality of apertures including the first aperture may be formed through the first standoff and may extend from the face of the first standoff to the proximal surface of the panel wall. The face of the first standoff may comprise at least one of a circular shape or a semi-circular shape. A second standoff may be formed over the distal surface of the panel wall. A second face of the second standoff may extends to the distal surface of the panel wall. In various embodiments, a third standoff may be formed over the distal surface of the panel wall. A third face of the third standoff may be parallel to the distal surface of the panel wall.

A method of making a combustor panel is provided according to various embodiments. The method may comprise forming a panel wall comprising a proximal surface and a distal surface opposite the proximal surface, forming a first standoff over the distal surface of the panel wall, and formed a first aperture through the first standoff. A first face of the first standoff may be oriented at a first angle between 90 degrees and 160 degrees relative to a plane parallel to the distal surface of the panel wall.

In various embodiments, the method may further comprise forming the first standoff using additive manufacturing. Forming the first standoff may comprise forming a wall of the first standoff at second angle between 10 degrees and 80 degrees relative to the distal surface of the panel wall. The method may further comprise forming a second standoff over the distal surface of the panel wall. A second face of the second standoff may be oriented at a second angle relative to the plane parallel to the distal surface. The second angle may be different from the first angle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
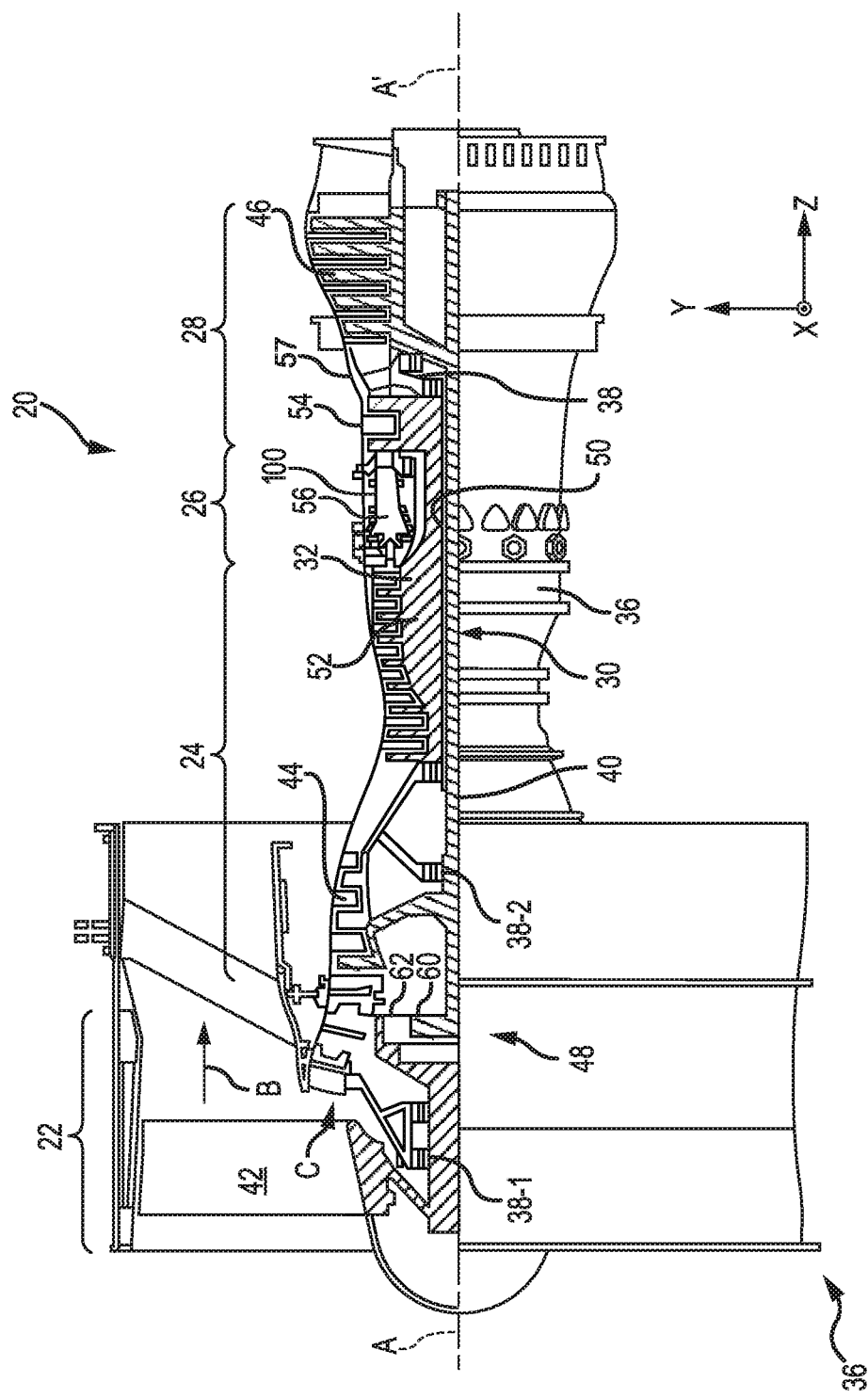
FIG. 1 illustrates a cross-sectional view of an exemplary gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction outward, or generally, away from a reference component. As used herein, "proximal" and/or "proximate" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. The terminology "radially outward" and "radially inward" may also be used relative to references other than the engine central longitudinal axis.

A combustor panels of the present disclosure may include a standoffs formed over a distal, or radially outward, surface of the combustor panel. The cooling holes may be formed integral with the standoffs such that each standoff includes a cooling hole. In various embodiments, the cooling holes may be formed at the same time as the standoff using, for example, an injection molding, stamping, casting, or additive manufacturing process. Forming the cooling holes integral to the standoffs may tend to prevent misalignment of the cooling holes and breakage of the standoffs. In addition, forming cooling holes integral with the standoffs may aid in recognition of presence or absence combustor panel defects, as cooling holes formed through standoffs may be inspected using automated, as opposed manual, inspection tools.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. As used herein, a "high pressure" compressor or turbine experiences a higher pressure than a corresponding "low pressure" compressor or turbine.

A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, combustor 56 may include a combustor panel 100. Combustor panel 100 may have a generally annular shape and may surround a combustion chamber through which core flowpath C travels.

Figure 2A:
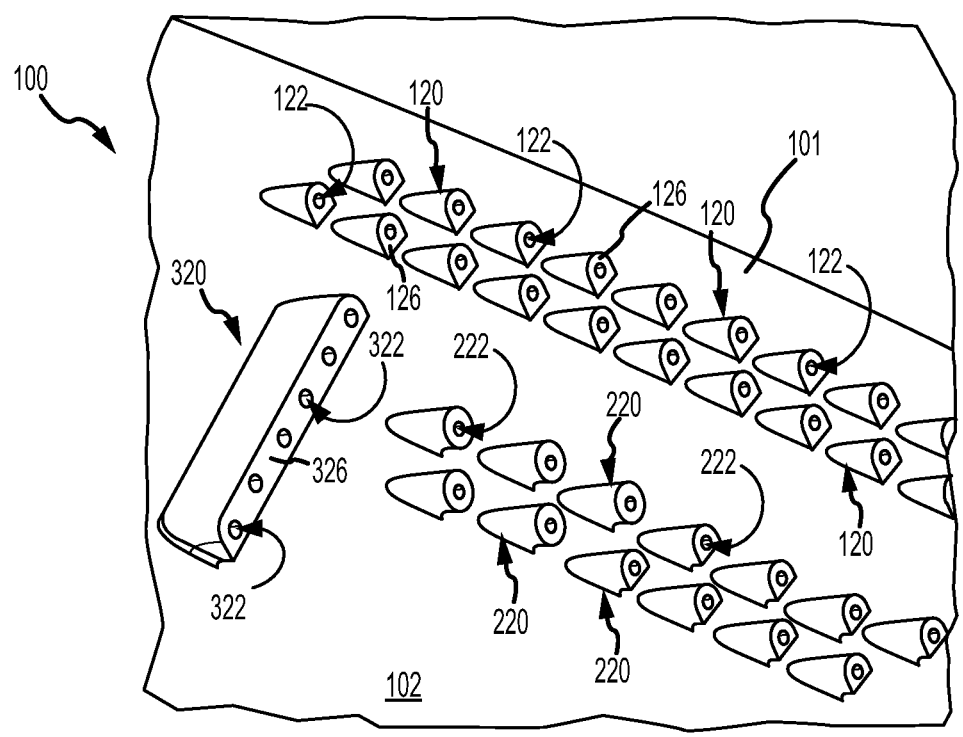
FIGS. 2A and 2B illustrate a distal surface and a proximal surface, respectively, of a combustor panel having standoffs with cooling holes, in accordance with various embodiments.
Figure 2B:
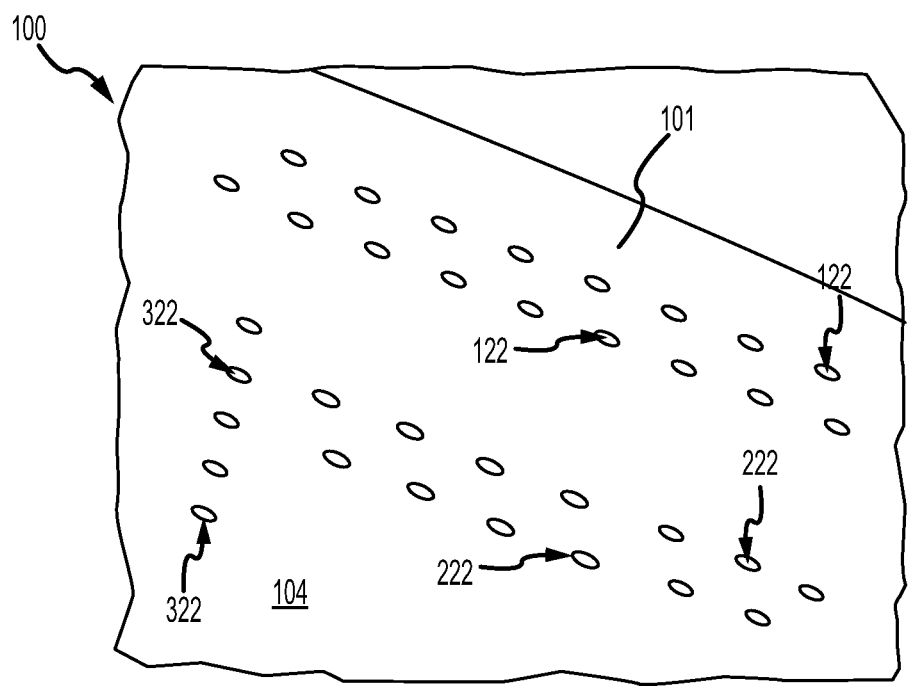

With reference to FIGS. 2A and 2B, a portion of combustor panel 100 is illustrated, in accordance with various embodiments. Combustor panel 100 may comprise a panel wall 101 having a distal surface 102 and a proximal surface 104 opposite distal surface 102. Proximal surface 104 may be oriented radially inward or generally toward the core flowpath C (FIG. 1). Distal surface 102 may be oriented radially outward or generally away from the core flowpath C. In various embodiments, with momentary reference to FIG. 2D, a thickness T1 of panel wall 101 extending from proximal surface 104 to distal surface 102 may be between 0.020 inches and 0.050 inches (i.e., between cm 0.051 cm and 0.127 cm). In various embodiments, thickness T1 may be between 0.030 inches and 0.040 inches (i.e., between 0.076 cm and 0.102 cm).

Returning to FIGS. 2A and 2B, a plurality of raised structures or "standoffs," including first standoffs 120 and second standoffs 220, may be formed over distal surface 102 of panel wall 101. First standoffs 120 and second standoffs 220 may extend radially outward from distal surface 102. In various embodiments, first standoffs 120 and second standoffs 220 may be integral to panel wall 101, for example, during a casting or injection molding process. In various embodiments, first standoffs 120 and second standoffs 220 may be formed over distal surface 102 of panel wall 101 using, for example, an additive manufacturing process. In various embodiments, panel wall 101, first standoffs 120, and second standoffs 220 may comprise a metal or metal alloy. For example, in various embodiments, panel wall 101, first standoffs 120, and second standoffs 220 may comprise nickel, titanium, steel, and/or alloys thereof. First standoffs 120 and second standoffs 220 may facilitate in a cooling of combustor panel 100 by increasing a surface area available for heat transfer. First standoffs 120 and second standoffs 220 may be formed an angle relative to distal surface 102. First standoffs 120 and second standoffs 220 may configured to direct cooling air from cooling holes formed through the standoffs.

Figure 2C:
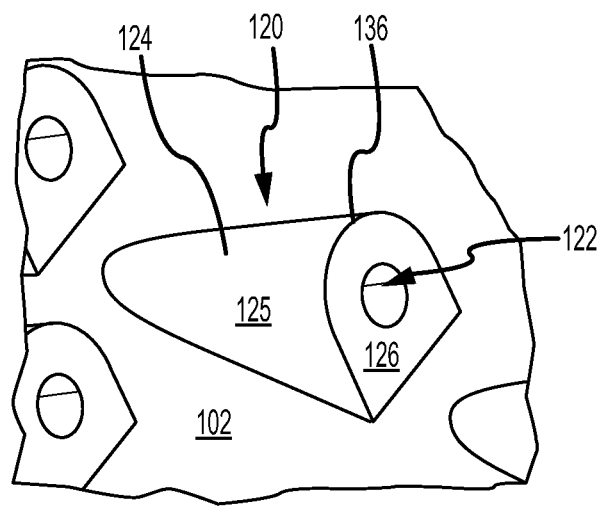
FIGS. 2C and 2D illustrate a perspective view and a cross-sectional view, respectively, of a combustor panel standoff, in accordance with various embodiments.
Figure 2D:
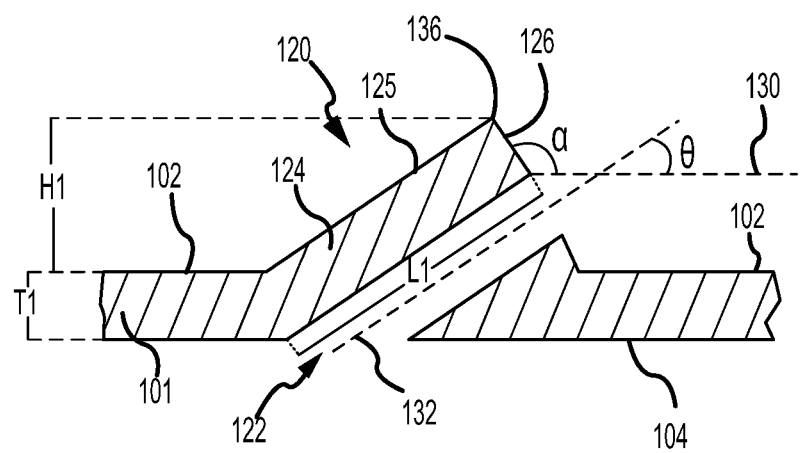

Referring to FIG. 2C and FIG. 2D, each first standoff 120 may having an opening or aperture 122 (also referred to as a cooling hole) formed there through. Aperture 122 may extend from a surface or face 126 of first standoff 120 to proximal surface 104 of panel wall 101. In various embodiments, aperture 122 may be cylindrically shaped. A central axis 132 of aperture 122 may be formed at an angle theta ($\theta$) relative to a plane 130 that is coplanar with distal surface 102. In various embodiments, angle $\theta$ may be between 10 degrees and 70 degrees. In various embodiments, angle $\theta$ may be between 20 degrees and 40 degrees. As angle $\theta$ decreases, a length L1 of apertures 122 extending from face 126 to proximal wall 104 may increase. Increasing length L1 of aperture 122 may tend to increase a cooling of combustor panel 100, as a longer aperture increases a surface area of panel wall 101 that may be exposed to cooling air.

A wall 124 of first standoff 120 may extend from distal surface 102 panel wall 101 to face 126 of first standoff 120. In various embodiments, wall 124 may be generally curved or comprise a rounded edge. Face 126 of first standoff 120 may extend to and contact distal surface 102. Face 126 of first standoff 120 may comprise a generally flat or planar surface. Face 126 may have a semi-circular shape. Face 126 may be oriented at an angle alpha ($\alpha$) relative plane 130. In various embodiments, angle $\alpha$ may be between 90 degrees and 170 degrees. In various embodiments, angle $\alpha$ may be between 100 degrees and 160 degrees. In various embodiments, angle $\alpha$ may be between 135 degrees and 155 degrees.

In various embodiments, aperture 122 may be formed through a center of first standoff 120 such that wall 124 may have a substantially uniform thickness, as used herein only "substantially uniform" means a ±5.0% difference. Stated another way, first standoff 120 may be formed around the central axis 132 of aperture 122 such that a thickness of wall 124 extending from aperture 122 to a surface 125 of wall 124 that is opposite aperture 122 may be substantially uniform. In various embodiments, a diameter of aperture 122 may be between 0.015 inches and 0.50 inches (i.e., between 0.038 cm and 1.27 cm). In various embodiments, a diameter of aperture 122 may be between 0.015 inches and 0.1 inches (i.e., between 0.038 cm and 0.254 cm). In various embodiments, a diameter of aperture 122 may be between 0.02 inches and 0.05 inches (i.e., between 0.051 cm and 0.127 cm). In various embodiments, a diameter of aperture 122 proximate face 126 may be less than a diameter of aperture 122 proximate proximal surface 104. For example, a diameter of aperture 122 proximate face 126 may be between 1% and 15% less than a diameter of aperture 122 proximate proximal surface 104.

First standoffs 120 having apertures 122 may be formed by injection molding, stamping, casting, machining, additive manufacturing, or other suitable manufacturing process. In various embodiments, first standoffs 120 and/or combustor panel 100, may be formed using additive manufacturing techniques. In various embodiments, a height H1 of first standoffs 120 extending radially from a distal edge 136 or crest of face 126 to distal surface 102 may be between 0.020 inches and 0.15 inches (i.e., between cm 0.051 cm and 0.381 cm). In various embodiments, height H1 may be between 0.030 inches and 0.07 inches (i.e., between 0.076 cm and 0.178 cm). In various embodiments, a ratio of the thickness T1 of panel wall 101 to the height H1 of first standoff 120 is between 1.5 to 1 and 1 to 4. In various embodiments, a ratio of the thickness T1 of panel wall 101 to the height H1 of first standoff 120 is between 1 to 1 and 1 to 2.

Figure 2E:
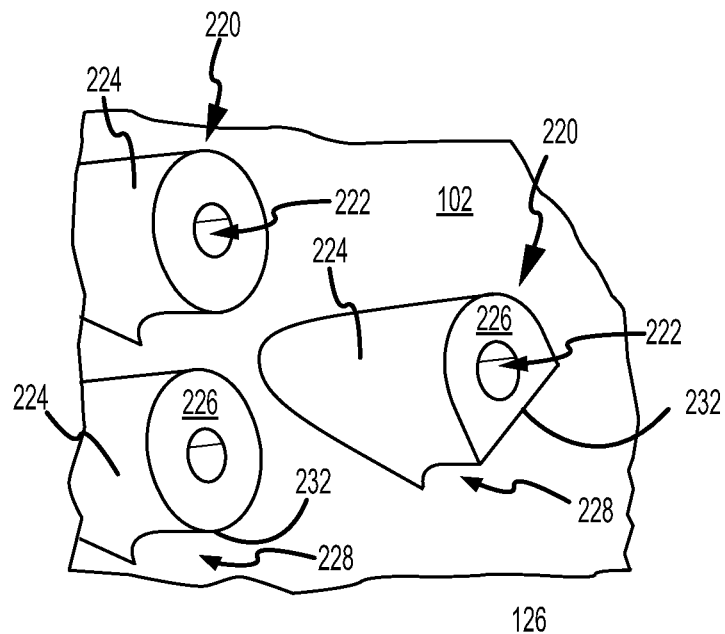
FIGS. 2E and 2F illustrate a perspective view and a cross-sectional view, respectively, of a combustor panel standoff, in accordance with various embodiments.
Figure 2F:
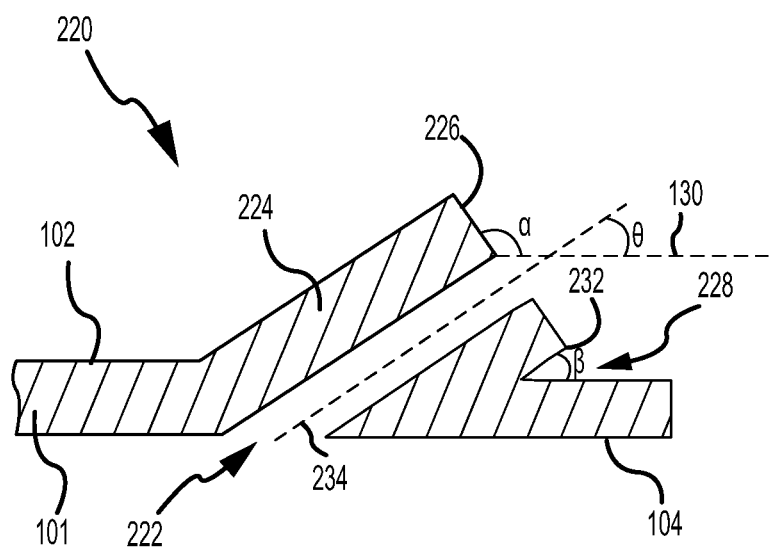

Referring to FIG. 2E and FIG. 2F, each second standoff 220 may define an opening or aperture 222 (also referred to as a "cooling hole"), similar to aperture 122 of first standoff 120 (FIG. 2D). Aperture 222 may extend from a surface or face 226 of second standoff 220 to proximal surface 104 of panel wall 101. In various embodiments, aperture 222 may be cylindrically shaped. A central axis 234 of aperture 222 may be oriented at angle θ relative to plane 130.

A wall 224 of second standoff 220 may extend from distal surface 102 to face 226 of second standoff 220. Face 226 may comprise a generally flat or planar surface. Face 226 may have a circular or a semi-circular shape. Face 226 may be oriented at an angle α relative plane 130, similar to apertures 122 in FIG. 2D. A proximal edge 232 of face 226 may be raised with respect distal surface 102, such that distal surface 102 and the portion of wall 224 extending from distal surface 102 to proximal edge 232 define a space or cavity 228 that is devoid of material. Stated another way, wall 224 of second standoff 220 and distal surface 102 of panel wall 101 may form an angle beta (β). In various embodiments, angle β may be between 10 degrees and 85 degrees. In various embodiments, angle β may be between 10 degrees and 60 degrees. In various embodiments, angle β may be between 20 degrees and 45 degrees. Proximal edge 232 being raised with respect distal surface 102 may increase a surface area of second standoff 220 as compared to the surface area of first standoff 120. In various embodiments, second standoffs 220 having aperture 222 may be formed by an additive manufacturing technique such as direct metal laser sintering, selective laser sintering, selective laser melting, electron-beam melting, or electron-beam freeform fabrication.

Figure 3:
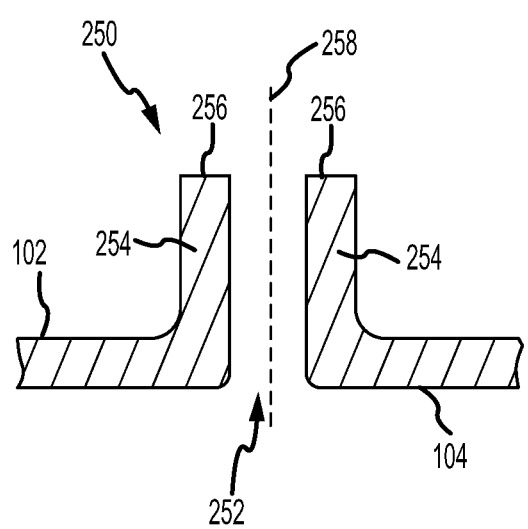
FIG. 3 illustrates a cross-sectional view of a combustor panel standoff, in accordance with various embodiments.

FIG. 3 illustrates a cross-sectional view of a standoff 250 which may be formed over distal surface 102 of panel wall 101, in accordance with various embodiments. Standoff 250 may define an opening or aperture 252 (also referred to as a "cooling hole"). Aperture 222 may extend from a surface or face 256 of standoff 250 to proximal surface 104 of panel wall 101. In various embodiments, aperture 122 may be cylindrically shaped. A central axis 258 of aperture 252 may be oriented orthogonal to plane 130 (FIG. 2D). Standoff 250 may be formed by injection molding, stamping, casting, machining, additive manufacturing, or other suitable manufacturing process.

A wall 254 of standoff 250 may extend from distal surface 102 to face 256 of standoff 250. In various embodiments, wall 124 may be generally cylindrical. Face 256 of standoff 250 may comprise a generally flat or planar surface. Face 256 may have a circular shape. Face 126 may be oriented parallel to distal surface 102. The orientation of face 256 may increase a surface area of standoff 250 as compared to first standoff 120 and second standoff 220, and decrease a length of aperture 252 as compared to apertures 122 and 222.

Returning to FIGS. 2A and 2B, in various embodiments, combustor panel 100 may comprise one or more elongated standoffs 320. A plurality of openings or apertures 322, similar to apertures 122, may be formed through each elongated standoff 320. Apertures 322 may extend from a face 326 of standoff 320 to proximal surface 104 of panel wall 101. Face 326 may be oriented at an angle between 90 degrees and 160 degrees relative to plane 130 (FIG. 2D). In various embodiments, face 326 may extend to distal surface 102, similar to face 126. In various embodiments, face 326 may be raised with respect distal surface 102, similar to face 226. Standoffs 320 may be formed by injection molding, stamping, casting, machining, additive manufacturing, or other suitable manufacturing process.

Combustor panel 100 may include any number and/or combination of standoffs. The distribution of the standoffs over distal surface 102, the diameter and angle of the apertures, and the angle and shape of the faces of the standoffs may be selected to provide predetermined amounts of cooling to various portions of combustor panel 100. For example, areas of combustor panel 100 that may benefit from increased heat dissipation may comprise standoffs with greater surface area (e.g., standoffs 220 and/or standoffs 250), and areas of combustor panel 100 that may benefit from increased cooling hole length may comprise standoffs having apertures oriented at smaller angles (e.g., oriented at angles θ between 10 degrees and 30 degrees).

Figure 4:
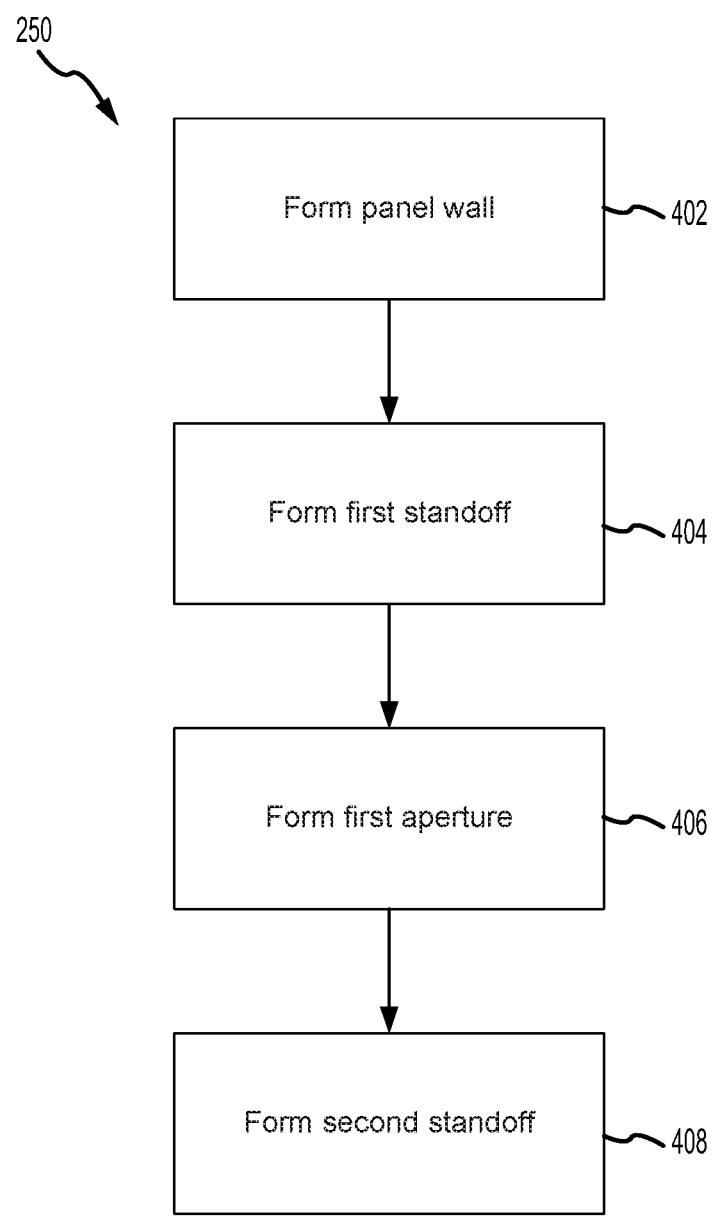
FIG. 4 illustrates a method of making a combustor panel having standoffs with cooling holes, in accordance with various embodiments.

With reference to FIG. 4 a method 400 of making a combustor panel is illustrated in accordance with various embodiments. Method 400 may comprise forming a panel wall comprising a proximal surface and a distal surface opposite the proximal surface (step 402), forming a first standoff comprising over the distal surface of the panel wall (step 404), and forming a first aperture through the first standoff (step 406). A first face of the first standoff may be oriented at a first angle between 90 degrees and 160 degrees relative to a plane parallel to the distal surface of the panel wall. In various embodiments, method 400 may further comprise forming a second standoff over the distal surface of the panel wall (step 408). A second face of the second standoff may be oriented at a second angle relative to the plane parallel to the distal surface. The second angle may be different from the first angle. In various embodiments, forming the first standoff may comprise using additive manufacturing. Forming the first standoff may comprise forming a wall of the first standoff at second angle between 10 degrees and 80 degrees relative to the distal surface of the panel wall.

In various embodiments, with combined reference to FIG. 4 and FIG. step 402 may comprise forming panel wall 101 comprising proximal surface 104 and distal surface 102. Step 404 may include forming first standoff 120 over distal surface 102. Step 406 may include forming aperture 122 through first standoff 120. Step 408 may include forming second standoff 220 over distal surface 102 of panel wall 101.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor panel, comprising: a panel wall comprising a proximal surface and a distal surface opposite the proximal surface; a first standoff formed over the distal surface of the panel wall, the first standoff being defined by a wall and a first face; and a first aperture formed through the first standoff and extending from the first face of the first standoff to the proximal surface of the panel wall, wherein the first aperture is cylindrically shaped, and wherein the first face of the first standoff is oriented at an angle between 90 degrees and 160 degrees relative to a plane parallel to the distal surface of the panel wall, and wherein a proximal edge of the first face is raised with respect to the distal surface, the proximal edge of the first face including a proximal point on the first face, the proximal point being a point on the first face that is located closest to the distal surface, and wherein the proximal point is located 180 degrees about a central axis of the first aperture from a distal point on the first face, the distal point on the first face being a crest point on the first face that is located farthest from the distal surface, and wherein the distal surface and a portion of the wall extending from the distal surface to the proximal point on the first face define a cavity devoid of material.

2. The combustor panel of claim 1, wherein the central axis of the first aperture is oriented at an angle between 10 degrees and 70 degrees relative to the plane parallel to the distal surface of the panel wall.

3. The combustor panel of claim 1, further comprising a plurality of apertures formed through the first standoff, the plurality of apertures including the first aperture.

4. The combustor panel of claim 1, wherein the portion of the wall extending from the distal surface to the proximal edge of the first face and the distal surface of the panel wall form an angle between 10 degrees and 60 degrees.

5. The combustor panel of claim 1, further comprising a second standoff formed over the distal surface of the panel wall, wherein a proximal edge of a second face of the second standoff is raised relative to the distal surface of the panel wall.

6. The combustor panel of claim 1, wherein the wall of the first standoff comprises a substantially uniform thickness.

7. The combustor panel of claim 1, wherein the first face of the first standoff comprises a circular shape.

8. The combustor panel of claim 1, wherein a first diameter of the first aperture proximate the first face of the first standoff is less than a second diameter of the first aperture proximate the proximal surface of the panel wall.

9. A gas turbine engine, comprising: a compressor; and a combustor in fluid communication with the compressor and including a combustor panel, the combustor panel comprising: a panel wall comprising a proximal surface and a distal surface opposite the proximal surface; a first standoff formed over the distal surface of the panel wall, the first standoff being defined by a wall and a first face; and a first aperture formed through the first standoff and extending from the first face of the first standoff to the proximal surface of the panel wall, wherein the first aperture is cylindrically shaped, and wherein the first face of the first standoff is oriented at an angle between 90 degrees and 160 degrees relative, to a plane parallel to the distal surface of the panel wall, and wherein a proximal edge of the first face is raised with respect to the distal surface, the proximal edge of the first face including a proximal point on the first face, the proximal point being a point on the first face that is located closest to the distal surface, and wherein the proximal point is located 180 degrees about a central axis of the first aperture from a distal point on the first face, the distal point on the first face being a crest point on the first face that is located farthest from the distal surface, and wherein the distal surface and a portion of the wall extending from the distal surface to the proximal point on the first face define a cavity devoid of material.

10. The gas turbine engine of claim 9, wherein the first aperture is oriented at an angle between 10 degrees and 70 degrees relative to the plane parallel to the distal surface of the panel wall.

11. The gas turbine engine of claim 9, wherein a ratio of a thickness of the panel wall to a height of the first standoff is between 1:1 and 1:2, the thickness of the panel wall being measured between the distal surface and the proximal surface of the panel wall, the height of the first standoff being measured between the distal surface of the panel wall and a distal edge of the first standoff.

12. The gas turbine engine of claim 9, further comprising a plurality of apertures formed through the first standoff and extending from the first face of the first standoff to the proximal surface of the panel wall, the plurality of apertures including the first aperture.

13. The gas turbine engine of claim 9, wherein the first face of the first standoff comprises a semi-circular shape.

14. The gas turbine engine of claim 9, further comprising a second standoff formed over the distal surface of the panel wall, wherein a proximal edge of a second face of the second standoff is raised with respect to the distal surface of the panel wall.

15. The gas turbine engine of claim 14, further comprising a third standoff formed over the distal surface of the panel wall, wherein a third face of the third standoff is parallel to the distal surface of the panel wall.

16. A method of making a combustor panel, comprising, forming a panel wall comprising a proximal surface and a distal surface opposite the proximal surface; and forming a first standoff over the distal surface of the panel wall, the first standoff being defined by a wall and a first face and including a first aperture extending from the first face to the proximal surface of the panel wall, wherein the first aperture is cylindrically shaped, and wherein the first face of the first standoff is oriented at a first angle between 90 degrees and 160 degrees relative to a plane parallel to the distal surface of the panel wall, and wherein a proximal edge of the first face is raised with respect to the distal surface, the proximal edge of the first face including a proximal point on the first face, the proximal point being a point on the first face that is located closest to the distal surface, and wherein the proximal point is located 180 degrees about a central axis of the first aperture from a distal point on the first face, the distal point on the first face being a crest point on the first face that is located farthest front the distal surface, and wherein the distal surface and a portion of the wall extending from the distal surface to the proximal point on the first face define a cavity devoid of material.

17. The method of claim 16, further comprising forming the first standoff using additive manufacturing.

18. The method of claim 17, wherein the forming the first standoff comprises forming the wall of the first standoff at second angle between 10 degrees and 80 degrees relative to the distal surface of the panel wall.

19. The method of claim 16, further comprising forming a second standoff over the distal surface of the panel wall, wherein a second face of the second standoff is oriented at a second angle relative to the plane parallel to the distal surface, and wherein the second angle is different from the first angle.

* * * * *